H. H. BOYCE.
INDICATING DEVICE FOR AUTOMOBILES.
APPLICATION FILED AUG. 26, 1913.
1,272,002.
Patented July 9, 1918.
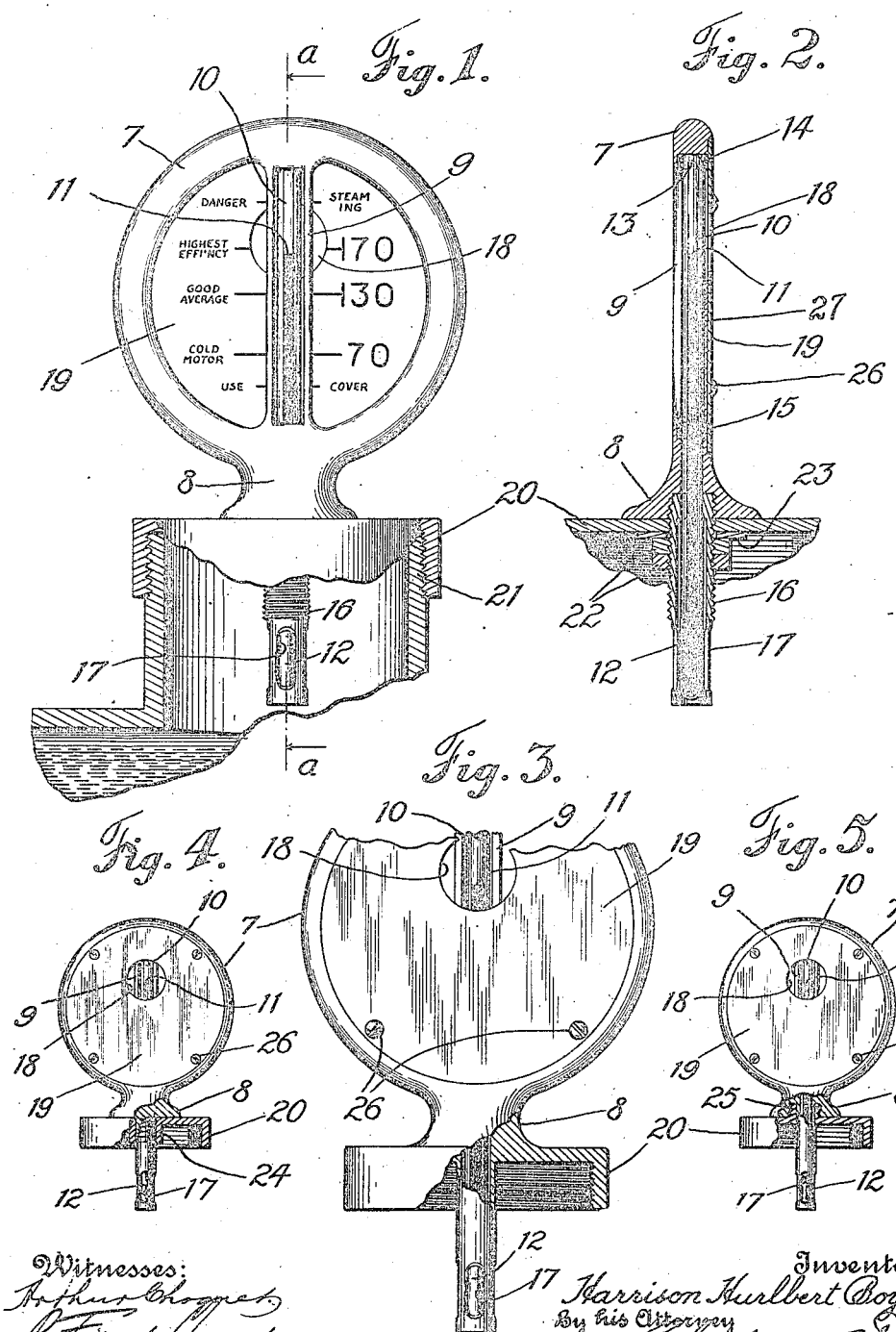

UNITED STATES PATENT OFFICE.

HARRISON HURLBERT BOYCE, OF FOREST HILLS, NEW YORK.

INDICATING DEVICE FOR AUTOMOBILES.

1,272,002.   Specification of Letters Patent.   Patented July 9, 1918.

Application filed August 26, 1913.   Serial No. 786,660.

*To all whom it may concern:*

Be it known that I, HARRISON HURLBERT BOYCE, a citizen of the United States, residing at Forest Hills, in the county of Queens and State of New York, have invented certain new and useful Improvements in Indicating Devices for Automobiles, of which the following is a full, clear, and exact description.

The present invention relates to a specific form of indicating device for automobiles, such as generally illustrated and described in my co-pending application, Serial No. 726,270, filed October 17th, 1912, and is directed to means for indicating whether or not the maximum efficiency is being obtained in the operation of an internal combustion engine, or gas engine of the stationary or portable type, and is particularly directed to the provision of a device for use in connection with automobile and other self-propelled vehicles having internal combustion engines for motive power, and wherein the engine or motor and its coöperating parts and systems are inclosed and out of sight of the operator of the engine under normal running conditions.

As is well known, an internal combustion engine is essentially a heat motor and under proper conditions of use and operation will only give the greatest efficiency when maintained at a predetermined normal temperature. To maintain the temperature at normal, the cooling and lubricating systems must coöperate with the engine, and the fuel must be fed thereto in such quantity and in a properly combustible mixture to produce an explosion which will not be of greater force than is required to drive the engine at the speed for which it is throttled. It consequently follows that any irregularity in the operation of the cooling or lubricating systems or other coöperating parts of the motive power plant, or in the feeding of the fuel thereto or the quantity or the quality of the mixture thereof, under certain driving conditions, will produce an abnormal temperature in the engine and cause an immediate loss of efficiency with a resultant increase in cost of operation. Furthermore, the continued operation or running of the engine under conditions other than normal will ultimately impair its usefulness and frequently result in injury to its structural parts.

In order to economically operate an internal combustion or gas engine and obtain its maximum efficiency, it is, therefore, of the utmost importance that the operator or driver have an accurate and positive knowledge of the state of the engine at all times, particularly where it is run under cold or severe climatic conditions. In so far as I am aware such knowledge is not now possible, especially where the engine and its parts are inclosed, the engine operator being compelled to depend practically wholly on the element of chance to inform him of an abnormal change in the temperature of his engine.

The object of the present invention is to ameliorate the present conditions under which internal combustion engines are run, and provide a means whereby the operator of an engine may be constantly cognizant of the state of his engine and be enabled thereby to instantly remedy any defect in the various parts of the motive power plant, or make such variation in his method of operation of the engine as may be necessary to attain efficient and economical operation thereof.

A further object of my invention is to provide a positive and accurate means of indicating the state or temperature of an internal combustion or gas engine, which may be cheaply manufactured and which will be of such a structure as will enable its ready installation as a component part of the motive power plant whether of the stationary or portable type such as is employed in motor vehicle construction, and, where used in connection with the latter, will be easily readable at a distance, this feature of my invention being a distinct advantage to the driver of a motor vehicle as he may thereby be informed of the state of his engine without leaving the driving seat of the car.

My invention also comprehends a device for indicating the temperature of an explosive or internal combustion engine which is not in direct contact therewith, but is so arranged with relation to a portion or part of the motive power plant of which the engine is the primary member, that the slightest variation from normal of the temperature of the engine, from any cause whatsoever, will influence my device and instantly inform the operator of the engine of the change in conditions.

Briefly stated, one embodiment of my invention, such as is employed in a power plant for a motor vehicle, wherein the engine is cooled by a circulating cooling medium flowing to and from the engine cylinder, which I have elected to illustrate and describe herein to give a clear and comprehensive understanding of my invention, though I would have it understood that my invention is not limited to such specific application but is equally adaptable to any motive power system embodying an internal combustion or gas engine, whether of the stationary or portable type, the arrangement of the indicating device in any part of the plant being optional so long as its operation may be influenced by the state or condition of the engine, comprises a tube of any suitable transparent material, such as glass, which is made to withstand an unusually high heat test and which contains a non-freezing indicating fluid which will also retain its homogeneity under the severe vibration to which the device as a part of the power plant will be subjected at times. This tube is mounted in a suitable support which is constructed to permit of its ready connection to a part of the cooling system, the indicating fluid being influenced by the temperature of the cooling medium which is subject to variations in keeping with the condition of the engine.

I will now proceed to describe my invention with reference to the specific embodiment illustrated in the drawings, and then point out with more particularity the novel elements thereof in the appended claims.

In the drawings:

Figure 1 is a front elevation of my invention showing the radiator cap and supply inlet, partly in section.

Fig. 2 is a sectional elevation on the line a—a of Fig. 1, and

Figs. 3, 4 and 5 are rear elevations of my device, partly in section, showing modified methods of mounting the same in operative position.

Referring now to the drawings in detail, in which like characters of reference are employed to designate similar parts throughout the several views, 7 indicates the frame of my device, which may be formed of any suitable material, but is preferably made of metal and of an annular configuration, though any other suitable shape may be employed. It will be observed that the annular portion of the frame 7 merges into a shoulder or abutment 8 at the bottom thereof which provides a rigid and ample base for the device, and which is an important factor in mounting the same in operative position as will be hereinafter more fully explained. While I have shown the shoulder or abutment 8 as of a specific shape, it is obvious that its configuration may be varied to suit such individual requirements as must be met to enable the employment of the device under different conditions.

Located centrally within the frame 7 and extending from top to bottom thereof as shown, is a second frame 9, having two parallel sides, which serves as a support for the tube 10 containing the indicating fluid 11.

Suitably mounted or positioned within the frame 7 and protected by the inner frame 9 is the glass tube 10 containing the indicating fluid 11, the tube 10 extending through a central bore in the shoulder or abutment 8, its lower end or bulb 12 projecting a considerable distance below said abutment for the purposes hereinafter explained. While the tube 10 may be mounted in any suitable manner, I have found it preferable, as herein shown, to embed the upper or teat end 13 thereof in a cement or other adhesive hardening substance 14 at the top of the inner portion of the frame 7, a slab 15 of similar material surrounding the tube 10 at the lower part of the frame 7. By this method, the tube 10 is rigidly held in position and at the same time is maintained out of contact with the frame 7.

It will be observed that the central bore in the shoulder 8 is threaded to engage the similarly threaded portion of the sleeve 16 which when positioned forms a protuberant portion, depending from the shoulder 8 and surrounding the bulb portion of the tube 10, efficiently protecting the same against fracture or breakage. This sleeve 16 as shown is open at its lower end and is provided with elongated apertures 17 in its wall in proximity to the bulb of the tube 10. This specific structure of the sleeve may be varied, however, inasmuch as it may be made in the form of a cap or thimble with a closed end, and may be provided with openings of circular or other desired shape, the function thereof being to protect the bulb 12 and at the same time permit of the influencing of the fluid 11 contained therein in the manner and for the purposes which will be hereinafter set forth.

The tube 10 is formed of a glass capable of withstanding a high heat test without injury, and contains the non-freezing indicating fluid 11 which will retain its solidity or homogeneity under severe conditions of vibration. This fluid is preferably colored so that it may be readily distinguished from a distance, its travel or movement within the tube being rendered more apparent by the provision of a sheet or piece of white celluloid, paper or like material 27, positioned within the inner frame at the rear of the tube 10, which serves to throw the fluid 11 into relief during a part of its movement within said tube. The sheet of material 27 extends from the bottom of the frame 7, upward to the lower edge of the sight opening or aperture 18 provided in the plate or disk 19 which is fitted to the frame 7 and secured thereto by means of screws 26 or the like, the strip of material 27 being firmly held in position behind the tube 10 between the rear edges of the sides of the frame 9 and the plate 19 bearing thereagainst and forming the back of the device.

In the employment of my invention in connection with the specific application and use herein illustrated and described, my device is connected to and operated by the cooling system of the motive power plant of the vehicle by attaching it to the usual cap or closure 20 of the radiator inlet 21 an aperture being made in the cap or closure 20 through which the depending sleeve 16 projects, the shoulder 8 forming the base of the device resting upon the exterior of the cap as shown. The device is then rigidly secured in position by the securing nuts 22 and coöperating washers 23, the former being threaded onto the exteriorly threaded portion of the sleeve 16. By this method, it will be seen that the device may be rigidly secured to and is practically made a fixed part of the cap which is firmly clamped between the shoulder 8 and the securing nuts 22.

While the method of mounting my device as explained in the foregoing is the preferred form, it may also be made integral with the cap 20 as shown in Fig. 3 of the drawings, the abutment or shoulder 8 merging into the upper or top surface of the cap. In Fig. 4, in lieu of the securing nuts 22, the sleeve 16 is threaded into the interiorly threaded boss 24 formed on the inner surface of the cap 20, while in Fig. 5, the abutment or shoulder 8 is formed with a threaded portion whereby it is adapted to engage an exteriorly threaded boss 25 provided on the top surface of the cap 20. The downwardly projecting sleeve which protects the thermometer bulb may be formed integral with the base 8, as shown in Figs. 4 and 5, or said sleeve may be attached to the base as shown in Fig. 2.

When my efficiency indicating device is mounted on the radiator cap 20, in any of the various ways shown and described herein, it will be observed from Fig. 1 that the protuberant portion or sleeve 16 and the bulb of the tube 10 project into the air space within the fluid supply inlet 21. The indicating fluid, therefore, registers the temperature of the air directly above the water level. By tests I have found that the air in this air space, until steam is created, is several degrees cooler than the water and, also, that the radiator is several degrees cooler at the bottom than at the top, consequently by locating the indicator as aforesaid, the indicating fluid under normal condition shows a temperature which is more nearly an average of the whole cooling system, not a single part of it as would be the case were the bulb of the instrument in direct contact with the water. By positioning the device so that the indicating fluid is responsive to the temperature within the space above the water line, (which I have found is usually somewhat lower than the temperature of the water prior to the time that the latter reaches the boiling or vaporizing point) the indicating fluid is subject to a disproportionate movement when the boiling point is reached, when a sudden and considerable rise of the indicating fluid takes place.

For example, the indicating fluid may indicate a temperature of say twenty degrees less than the actual temperature of the water, this variation being maintained until the water reaches the boiling or vaporizing point. When it does reach this point, the steam immediately acts upon the indicating fluid, causing it not only to quickly jump and twenty degrees mentioned, but to continue and rise as the heat of the steam increases, until the indicating tube is full. Thus a very effective and noticable warning signal is given indicating an abnormal condition which may be created from various causes such as a broken fan belt, lack of lubrication, etc.

The advantages of my indicator are obvious, as it is apparent that any defect in the lubricating system, or in the cooling system from any cause will produce a rise of temperature in the power plant which will be quickly communicated to my instrument and the information will be instantly conveyed thereby to the operator. The movement of the indicating fluid is thrown into relief by the provision of the strip of celluloid or the like 27, the tube 10 also serving to highly magnify the column of indicating fluid, until it reaches the sight opening 18 in the plate 19 where it is plainly visible in daylight and also at night, in the latter case the reflected light from the lamp of the vehicle, where my device is used in connection with a vehicle power plant throwing the column of indicating fluid into relief.

The indicia illustrated on the front of plate 19 in Fig. 1 of the drawings shows the various conditions of the power plant which are readily indicated to the operator by my device.

While I have illustrated and described my invention more or less in its application to a motor vehicle power plant, it is entirely obvious that it is equally applicable to any type of power plant employing an internal combustion or gas engine, whether of the portable or stationary type, also, that the details of structure herein shown and described may be varied or changed without departing from the spirit and scope of my invention.

Having thus described my invention what I claim as new herein and desire to secure by Letters Patent is:

1. In combination with the radiator cap of an automobile, an annular supporting frame, a plate mounted therein and provided with an indicating scale, a temperature responsive indicating means positioned contiguous to said plate, and coöperating therewith, and a pair of protecting members extending transversely of said supporting frame and disposed in close proximity to said temperature indicating means to prevent injury thereto.

2. In combination with an automobile radiator cap, a thermometer, an indicia plate juxtaposed thereto, a supporting frame supporting the thermometer and scale plate in operative relation, said plate being provided with a sight opening and means for accentuating the relative movements of the fluid of the thermometer positioned between said plate and said thermometer and terminating at the lower edge of the sight opening and means for protecting the thermometer, said means consisting of protecting members extending parallel along the sides of the thermometer and formed integral with the supporting frame.

3. The combination with a radiator cap of an automobile, said cap having an opening, of an indicating device embodying an open frame mounted on said cap, an indicia plate attached at its edges to said frame and extending across the opening in the latter, a thermometer tube carried by said frame and extending vertically across the same in front of said indicia plate, the lower portion of said thermometer tube extending through the opening in said radiator cap and means for throwing the exposed portion of said thermometer tube into relief comprising a narrow vertically disposed strip of light reflecting material mounted behind said thermometer tube and between the same and said indicia plate.

4. In combination, a thermometer, an indicia plate juxtaposed thereto, a supporting frame supporting the thermometer and indicia plate in coöperative relation, said plate being provided with a sight opening contiguous to said thermometer, and means for protecting the thermometer, said means consisting of protecting members extending parallel along the sides of the thermometer and formed integral with the supporting frame, and a strip of celluloid positioned between said dial plate and said protecting members and terminating at said sight opening for accentuating the movement of the fluid in the thermometer.

5. In combination with an automobile radiator cap, provided with a central orifice, an indicating device embodying a supporting frame, a temperature responsive element positioned within said frame and having a dependent portion adapted to project through the orifice in said cap into the radiator, and indicia plate mounted within said frame and provided with a sight opening in proximity to the upper edge thereof, means for protecting said temperature responsive element against injury, said means consisting of protecting members, extending parallel along the sides of the thermometer and formed integral with the supporting frame, and screw threaded means carried by said supporting member and adapted to engage with said radiator cap to firmly secure said indicating device in operative position thereon.

6. In combination with the cap of an automobile radiator, provided with a central orifice, an indicating device embodying a supporting frame, a temperature responsive element positioned therein, and out of contact therewith, and having a dependent portion adapted to project through said orifice in said cap, a plate mounted within said frame and provided with indicia arranged to coöperate with said temperature responsive element, said plate having a sight opening in proximity to the top thereof, means for protecting said temperature responsive element against injury, said means consisting of protecting members extending parallel along the sides of the thermometer within the supporting frame, means for accentuating the movement of the indicating means within the temperature responsive element, positioned between said temperature responsive element and said plate, and terminating at the lower edge of the sight opening and means carried by said supporting frame and arranged for screw threaded engagement with said cap to firmly secure said indicating device in operative position thereon.

7. The combination with a radiator filler cap of an automobile, said cap having an opening, of a frame having a base adapted to rest upon said filler cap, said base having an opening therethrough and an internally screw-threaded socket formed in its lower surface around said opening, a thermometer mounted within said frame and having a portion extending through the opening in the base thereof and adapted to depend through the opening in the filler cap into the radiator and a sleeve adapted to protect the depending portion of said thermometer tube and also to form means for attaching said instrument to said filler cap, said sleeve having a continuous thread cut on a portion of its outer surface, the upper threaded end of said sleeve screwing into the threaded socket in the base of said frame, the threaded portion of the sleeve projecting through the opening in said filler cap and a nut screwing on the threaded portion of said sleeve below said filler cap for clamping said instrument and filler cap together.

In witness whereof I have hereunto set my hand in the presence of two subscribing witnesses this 31st day of July, 1913.

HARRISON HURLBERT BOYCE.

Witnesses:
P. FRANK SONNEK,
WM. C. DUNN.